United States Patent
Risch et al.

(10) Patent No.: US 8,858,878 B2
(45) Date of Patent: Oct. 14, 2014

(54) WATER SYSTEM FOR A VEHICLE AND METHOD FOR REDUCING GERMS IN A WATER SYSTEM

(71) Applicant: Airbus Operations GmbH, Hamburg (DE)

(72) Inventors: Timo Risch, Hamburg (DE); Thorsten Otto, Hamburg (DE); Claus Hoffjann, Hamburg (DE); Andreas Dannenberg, Hamburg (DE); Christiane Lindauer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/661,245

(22) Filed: Oct. 26, 2012

(65) Prior Publication Data
US 2013/0094994 A1   Apr. 18, 2013

Related U.S. Application Data

(63) Continuation of application No. PCT/EP2011/056549, filed on Apr. 26, 2011.

(60) Provisional application No. 61/327,975, filed on Apr. 26, 2010.

(30) Foreign Application Priority Data

Apr. 26, 2010   (DE) .................. 10 2010 018 273

(51) Int. Cl.
| | |
|---|---|
| *A61L 2/20* | (2006.01) |
| *C02F 1/50* | (2006.01) |
| *C02F 1/02* | (2006.01) |
| *B64D 11/02* | (2006.01) |
| *B64D 11/04* | (2006.01) |
| *B63J 1/00* | (2006.01) |

(52) U.S. Cl.
CPC ... *C02F 1/02* (2013.01); *C02F 1/50* (2013.01); *B64D 11/02* (2013.01); *B64D 11/04* (2013.01); *C02F 2201/008* (2013.01); *C02F 2201/009* (2013.01)
USPC ........................................ 422/26; 137/899.2

(58) Field of Classification Search
CPC ................ B63J 1/00; A61L 2/18; A61L 2/20; A61L 2/07
USPC ........... 429/456; 205/743; 422/26, 28, 29, 37; 137/899.2
See application file for complete search history.

(56) References Cited

U.S. PATENT DOCUMENTS

| | | |
|---|---|---|
| 7,036,314 B2 | 5/2006 | Hoffjann et al. |
| 2005/0126927 A1* | 6/2005 | Lindauer et al. .............. 205/743 |
| 2008/0299432 A1* | 12/2008 | Hoffjann et al. ................ 429/30 |

FOREIGN PATENT DOCUMENTS

| | | | |
|---|---|---|---|
| DE | 8814968 U1 | 4/1989 | |
| EP | 1025917 | * 8/2000 | ................ B08B 9/02 |
| GB | 876846 | 9/1961 | |

OTHER PUBLICATIONS

Espacenet Bibliographic data page and English abstract of EP 1025917 Schroeter et al. Aug. 2000.*

(Continued)

*Primary Examiner* — Sean E Conley
*Assistant Examiner* — Donald Spamer
(74) *Attorney, Agent, or Firm* — Ingrassia Fisher & Lorenz, P.C.

(57) ABSTRACT

A water system for a vehicle is provided. The water system comprises at least one water supply source, at least one water-conducting device, at least one closing valve and at least one germ reduction connection. The germ reduction connection and the water supply source are connected to the water-conducting device. The germ reduction connection is designed to introduce a germ-reducing fluid into the water-conducting device. The closing valve is arranged between the water supply source and the germ reduction connection and is designed to be fully closed thus preventing the ingress of germ-reducing fluid into the water supply source. By means of such a water system it is possible to carry out sterilization or disinfection very easily and quickly without this requiring any major maintenance work.

15 Claims, 4 Drawing Sheets

(56) References Cited

OTHER PUBLICATIONS

English Machine translation of EP 1025917 Schroeter et al. Aug. 2000.*

International Searching Authority, International Search Report dated Oct. 26, 2011 for International Patent Application No. PCT/EP2011/056549.

* cited by examiner

WATER SYSTEM FOR A VEHICLE AND METHOD FOR REDUCING GERMS IN A WATER SYSTEM

CROSS-REFERENCE TO RELATED APPLICATIONS

This is a continuation of International Application No. PCT/EP2011/056549, filed Apr. 26, 2011, which claims priority to U.S. Provisional Patent Application No. 61/327,975, filed Apr. 26, 2010, and to German Patent Application No. 10 2010 018 273.7, filed Apr. 26, 2010, which are hereby incorporated by reference in their entirety.

TECHNICAL FIELD

The present disclosure relates to a water system in an aircraft, to a method for germ reduction of a water system in an aircraft, and to an aircraft comprising a water system.

BACKGROUND

Nowadays any larger commercial aircraft usually comprises a water system that on board the aircraft in flight provides water of drinking quality. A standard water system of an aircraft supplies water consumers, for example toilets, galleys, water dispensers and the like, from a central water supply system, and removes used water, depending on the type of soiling, to a gray water system or to a black water system.

Fresh water is usually filled into the water system of the aircraft, by way of water supply systems, when the aircraft is on the ground, for example with the use of tanker trucks. Because of the danger of propagation of microbiological impurities in a water system it is necessary to keep the bacterial count within specified limits. In water systems, at present, disinfection is used in order to achieve a reduction in the microbiological bacterial count. For disinfection, a chemical disinfectant is added to the water system, and by means of multiple rinses the disinfectant is channeled through the water system so that disinfection takes place. Furthermore, treatment of the fresh water by means of UV light during the filling up of the aircraft, i.e. by means of physical disinfection, is known.

In principle it is known not to limit the water supply in aircraft water systems to the use of a previously filled-in quantity of potable water; instead there are also concepts for implementing the water supply in part also by means of water generators, for example in the form of a fuel cell, and to couple it to a water supply from water tanks. Disinfection of such an expanded water system would be very expensive, because when compared to conventional aircraft water systems a larger number of different water-conducting devices would have to be subjected to disinfectants, and consequently during times periods when the aircraft is on the ground additional work has to be carried out, which due to the considerable expenditure of time and personnel is cost intensive. In addition, in an alternative use of water from water generators, disinfection with chemical disinfectants is not applicable if flight-specific and safety-relevant systems, e.g. engines, are subjected to the water.

DE 10 2006 002 470 and WO 2007 028 622 A1 show a fuel cell system for supplying potable water and oxygen to an aircraft.

Accordingly, it can be desirable to provide an improved water system and method for reducing germs in a water system. In addition, other objects, desirable features and characteristics will become apparent from the subsequent summary and detailed description, and the appended claims, taken in conjunction with the accompanying drawings and this background.

SUMMARY

According to various exemplary aspects of the present disclosure, provided is a system and method for simple germ reduction of a water system of a vehicle that can be carried out so that maintenance work may be significantly reduced.

According to one exemplary embodiment of the present disclosure, provided is a water system for a vehicle, in which water system germ reduction can be carried out in a particularly simple, fast and economical manner so that maintenance work may be reduced to a minimum.

Furthermore, according to another exemplary embodiment of the present disclosure, provided is a method by means of which particularly easy germ reduction can be carried out so that maintenance work on the ground may be reduced to a minimum.

An exemplary embodiment of the water system according to the present disclosure comprises at least one water supply source, at least one water-conducting device, at least one closing valve, and at least one germ reduction connection. The germ reduction connection and the water supply source are connected to the water-conducting device. The germ reduction connection is designed to introduce a germ-reducing fluid into the water-conducting device. The closing valve is arranged between the water supply source and the germ reduction connection and is designed to be fully closed and to prevent any ingress of germ-reducing fluid into the water supply source.

The water supply source may primarily be designed as a water tank that may provide a limited quantity of fresh water. It would also be possible to use a multitude of water tanks which are, for example, arranged near water-consuming devices. The number, type and design of water tanks is not significant in the context of the present disclosure, and further, the present teachings are not limited to the use of water tanks.

The water-conducting device may be a line network that is designed with normally used components, for example one or several pipelines, that are connected to coupling elements, junction branches, valves or the like. The water-conducting device is intended to provide water from the water supply source to the water consuming devices.

The closing valve may, for example, be designed as an electrically, pneumatically or hydraulically operable control valve which, for example is opened or closed in response to an externally supplied signal, thus permitting or preventing any flow-through of the germ-reducing fluid.

The germ reduction connection and the water-conducting device are fluidically connected to each other so that the germ reduction connection is equipped, without further modification of the water system, to introduce a germ-reducing fluid into the water-conducting device. The germ reduction connection may be designed in the form of a flange, a nozzle or a component of some other form, to which a source for a germ reduction fluid can be attached.

In this arrangement, the germ-reducing fluid may be implemented in various ways so that as a result of the introduction of the germ-reducing fluid, disinfection or sterilization of the water-conducting system is carried out. These two germ reduction methods differ according to the definition in that during sterilization a substantially total absence of germs is to be achieved, while during disinfection the microbiological bacterial count is reduced to an extent that makes any occurrence of an infection improbable. Therefore a multitude of differently effective germ-reducing fluids is imaginable for application in the water systems according to the present disclosure. For sterilization, the germ-reducing fluid, for example steam, may be at a sufficiently high temperature so that as a result of the introduction of the steam into the water-conducting device the latter is heated to such an extent that any germs therein are completely deactivated. In contrast to this, during disinfection, a chemical compound may be introduced into the water-conducting device. Chlorine-based compounds, for example chlorine dioxide, calcium hypochlorite solutions, or sodium hypochlorite solutions or hydrogen peroxide could be used. Chlorine may be electrolytically produced and metered locally from sodium chloride solutions; likewise, generating chlorine dioxide solutions would be suitable. According to established regulations relating to the treatment of potable water, only limited quantities of disinfectants are allowed to establish contact with potable water, and consequently, metering and rinsing of disinfectants needs to be set and monitored with the use of means and equipment that are known to the average person skilled in the art.

The closing valve between the water supply source and the germ reduction connection should be completely closable so that the germ-reducing fluid does not pose any danger to the water supply source, and for example, so that a potable water tank outside the disinfection intervals does not establish contact with the germ-reducing fluid.

The core of the present disclosure thus comprises modifying a conventional water-conducting device in such a manner that normal operation of the water system is possible, while at the same time, by means of the germ reduction connection in a very simple manner by blocking access to the water supply source during down times of the vehicle, the water-conducting devices within the vehicle can in an uncomplicated manner, by connecting an external source for a germ-reducing fluid or in situ by constant carrying along and activation of a source for a germ-reducing fluid may be germ-reduced. Major maintenance procedures, which during maintenance cycles of the vehicle take place at considerable expenditure of time and, for example in the case of contamination with germs of individual water-consuming monuments situated in a cabin, require disinfection of the entire water system, may be reduced.

According to an exemplary embodiment of the water system according to the present disclosure, the water supply source is at least in part designed as a fuel cell which when generating electricity produces steam that is condensed and may be fed to the water consumer. For reasons associated with weight this is very advantageous, as is well known, because, for example in modern commercial aircraft but also in earth-based or rail-bound vehicles, fuel cells are already used or planned for future operation, wherein steam arises as a byproduct. This may very easily be used to provide an additional water supply so that the necessary quantity of water carried along in water tanks can be reduced. Disinfection or sterilization of a water-conducting device is problematic where a fuel cell is integrated in the water supply, because any contact of germ-reducing fluids with the fuel cell must be absolutely avoided in order to prevent damage to the fuel cell.

According to an exemplary embodiment, the water system according to the present disclosure comprises a first closing valve, which is arranged directly on an exhaust gas connection of the fuel cell, and a second closing valve, which is arranged on a connecting line to a water tank. In this arrangement the germ reduction connection is situated between the first closing valve and the second closing valve so that the water-conducting device of the fuel cell system may be treated in isolation for the purpose of germ reduction. Correspondingly, to maintain a low bacterial count of the water-conducting devices of the fuel cell system it is not necessary to always carry out germ reduction of the entire water system of the vehicle. This saves time, energy and expenditure.

According to an exemplary embodiment, the water-conducting device comprises at least one vent valve that is designed to be opened during the process of germ reduction so that introduced germ-reducing fluid may exit at that position. In a closed water system with a closed water-conducting device it would otherwise not be possible to introduce a germ-reducing fluid without significant increase in the pressure of the water-conducting device.

According to another exemplary embodiment, the water-conducting device comprises at least one water-conducting component that comprises a process sensor for checking the germ reduction time or for checking the process of germ reduction. The water-conducting component may, for example, be a separate line branch of a complex water pipe system, a branch piece, a connecting piece or the like. In this arrangement the process sensor may be positioned in the water-conducting component in fluidic connection so that the status of the process of germ reduction may be determined.

According to another exemplary embodiment, the process sensor may be designed as a temperature sensor which, for example when the water-conducting component is subjected to steam, determines the point in time at which a temperature required for the intended type of germ reduction has been attained.

According to another exemplary embodiment, the process sensor may be designed as a material sensor that registers the presence and the concentration of a chemical compound comprising chlorine.

It would, for example, also be imaginable to equip a multitude of water-conducting components with such a process sensor in order to, in all relevant regions of the water system, acquire the presence of adequate germ reduction and, for example, to isolate already sufficiently germ-reduced regions of the water system by means of closing valves present in those locations to stop continuing to subject them to germ-reducing fluid.

According to an exemplary embodiment, the water system according to the present disclosure comprises at least one control unit that is connected to the at least one closing valve. The control unit is equipped to close the closing valve when the process of germ reduction is carried out, and consequently the germ-reducing fluid may be fed to the water-conducting device.

According to an exemplary embodiment of the present disclosure, the control unit is connected to the at least one process sensor and is designed, when detecting that a period of time required for germ reduction has passed, at a germ-reducing state at least on the respective process sensor or on all process sensors to completely stop the process of germ reduction, or to stop germ reduction in the particular region merely by sequential control of the respective closing valves.

According to an exemplary embodiment of the present disclosure, the water system according to the present disclosure comprises a water treatment unit that is connected to the water-conducting device and to which in parallel a bypass is arranged that is connected to the water-conducting device by way of bypass valves. This is necessary in order to protect the water treatment device from being damaged by the germ-reducing fluid when carrying out germ reduction. To this effect access to the water treatment device may be blocked and the bypass may be opened so that no germ-reducing fluid flows around the water-treating components. The water treatment device may be a mineralization unit or the like.

In another exemplary embodiment the water system according to the present disclosure comprises a source for germ-reducing fluid. In this manner it is possible to carry out, in the vehicle in situ in an uncomplicated and very quick manner, germ reduction within a water-conducting device.

In an exemplary embodiment the source of a germ-reducing fluid is designed as a steam generator that is connected to a water supply source. In this manner temperature-based sterilization by means of the water-conducting device may be carried out.

According to an exemplary embodiment, the source of a germ-reducing fluid is a device for delivering a liquid disinfectant. This device may, for example, comprise a tank with the liquid disinfectant and a means for conveying the liquid disinfectant.

According to another exemplary embodiment of the present disclosure, a method for reducing germs in water-conducting devices in an aircraft is provided. The method generally comprises closing valves to at least one water supply source; introducing a germ-reducing fluid into at least one water-conducting device; interrupting the introduction of the germ-reducing fluid; opening the closing valves; and rinsing the water-conducting device with water.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
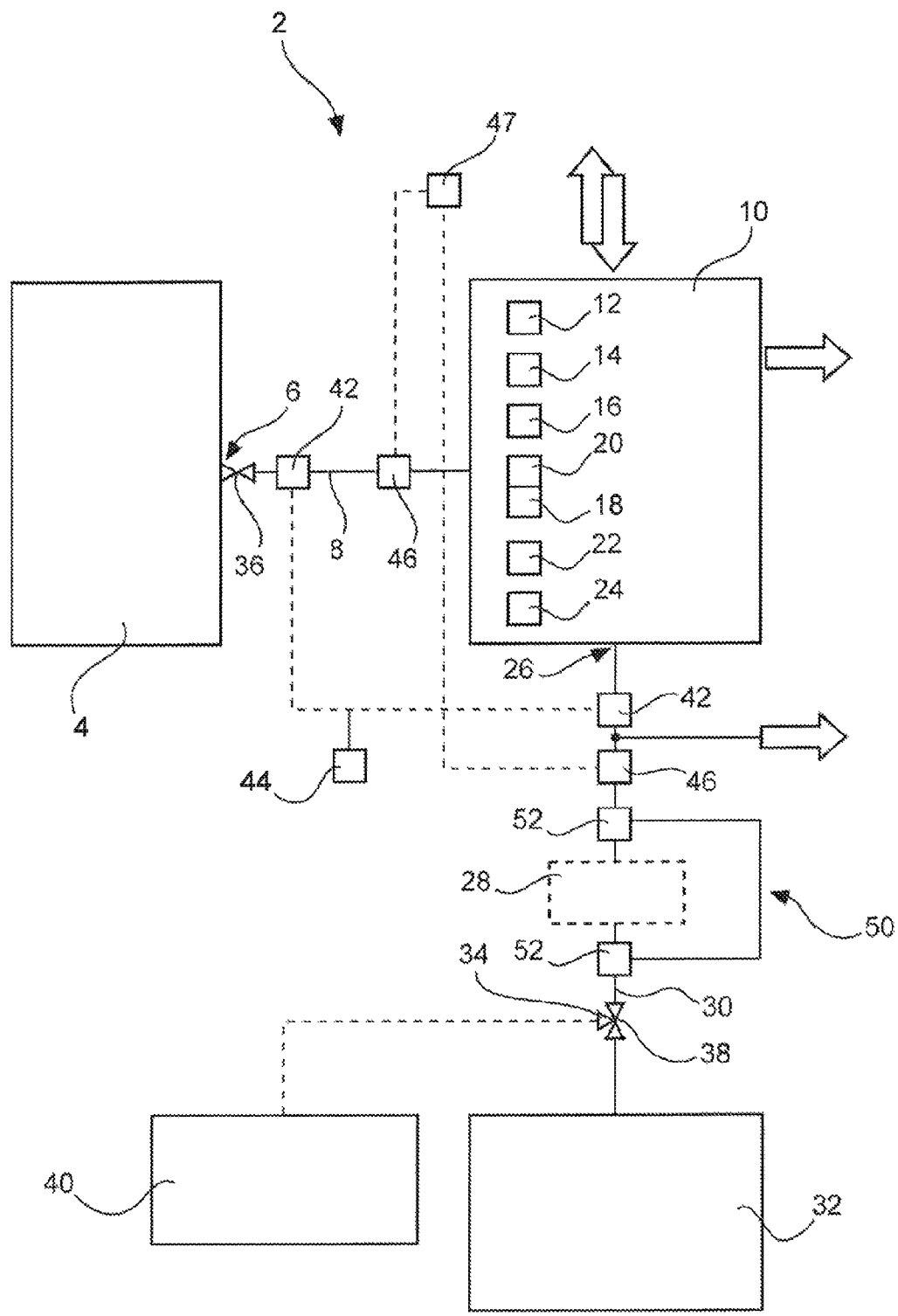
FIG. 1 shows an exemplary embodiment of a water system according to the present disclosure.

FIG. 1 shows a diagrammatic view of a first exemplary embodiment of a water system 2 according to the present disclosure, which water system 2 is designed, apart from storing water, to also generate water. The water system 2 according to the present disclosure is, furthermore, able to carry out germ reduction in the form of sterilization.

The water system 2 according to the present disclosure comprises a fuel cell system 4 that at an exhaust gas connection 6 delivers exhaust gases which during regular operation of the fuel cell 4 for generating electricity containing steam. By means of an exhaust gas line 8 a water extraction device 10 follows on in which the steam from the exhaust gas of the fuel cell 4 is condensed in order to be accessible for supplying water on board the aircraft. Apart from necessary components for water extraction, the water extraction unit 10 may also comprise a buffer storage device 12 in which extracted water may be stored when it is not possible to entirely deliver it through the water system to water consumers. In addition, one or several heat exchangers 14 may be arranged within the water extraction unit 10 in order to deliver heat from the exhaust gas to the environment or to various heat-consuming systems, for example a de-icing system or the like. A fill level sensor 16, a heating element 18, a temperature sensor 20, a water pump 22, air separation modules 24 and the like may additionally be arranged in the water extraction unit 10 in order to prepare inert gas for inertization systems and oxygen-enriched air for other purposes. The heating element 18 and the temperature sensor 20 may prevent water from freezing.

However, generally the water extraction unit 10 comprises a water outlet 26 at which de-ionized water from the steam of the fuel cell system 4 is provided. This water may be used without any further preparation for devices within the aircraft, in which devices there is a danger of calcinations if conventional potable water comprising minerals were to be used. A water treatment unit 28, which may be arranged in the water system 2 according to the present disclosure, may treat the de-ionized water from the water outlet 26 in such a manner that as a result of mineralization it has potable-water quality. The water treated in this manner may be fed, by way of a water pipe 30, into a water supply tank 32 where it is mixed with previously filled-in water low in germs, with the mixture being fed to water consumers.

The exhaust gas line 8 between the fuel cell system 4 and the water extraction unit 10, the water pipe between the water outlet 26 and the water supply tank 32, and all the devices within the water extraction unit 8 may be sterilized very easily by introducing a germ-reducing fluid from a germ reduction connection 34. In the case of the exhaust gas line 8, this may not be necessary if at the point of outlet of the exhaust gas from the fuel cell system 4 the temperature in the exhaust gas line is permanently above about 70° C. In order to protect the sensitive fuel cell system 4 and the water supply tank 32, closing valves 36 and 38 are then closed. At the germ reduction connection 34, in the case of sterilization, steam may be introduced that is generated by a steam generator 40 that may be situated on board the aircraft or may be used as a ground device for easier sterilization when the aircraft is on the ground.

In order to prevent damage to the water-conducting devices in the form of the exhaust gas line 8 and the water pipe 30 as a result of pressurization during the introduction of the germ-reducing fluid, and in order to achieve complete wetting and rinsing of the system to be treated, including stub lines, it would be possible to arrange discharge valves 42 at several locations of the water system 2, by means of which discharge valves 42 surplus germ-reducing fluid or rinse water is, for example, channeled to the outside or into a recovery tank 44.

With steam sterilization it is advantageous to arrange temperature sensors 46 in the water-conducting devices, by means of which temperature sensors 46 a control unit 48 is able to determine a sterilization state. This may, for example, comprise detecting an adequately high sterilization temperature, and determining an adequately long period of time at an adequately high sterilization temperature.

Likewise, the control unit 48 could in one example, be connected to the closing valves 36 and 38 in order to, prior to sterilization, block the outflow to the fuel cell system 4 or to the water supply tank 32.

Furthermore, the control unit 48 may be connected to the discharge valves 42 in order to close the aforesaid on completion of the sterilization process, or in order to open the aforesaid at commencement of the sterilization process.

In order to protect the optional water treatment device 28 a bypass 50 may be provided, which comprises bypass valves 52 which on commencement of germ reduction are switched in such a manner that flow-through of the water treatment device 28 with germ-reducing fluid is prevented, and instead said fluid flows through the bypass 50.

Figure 2:
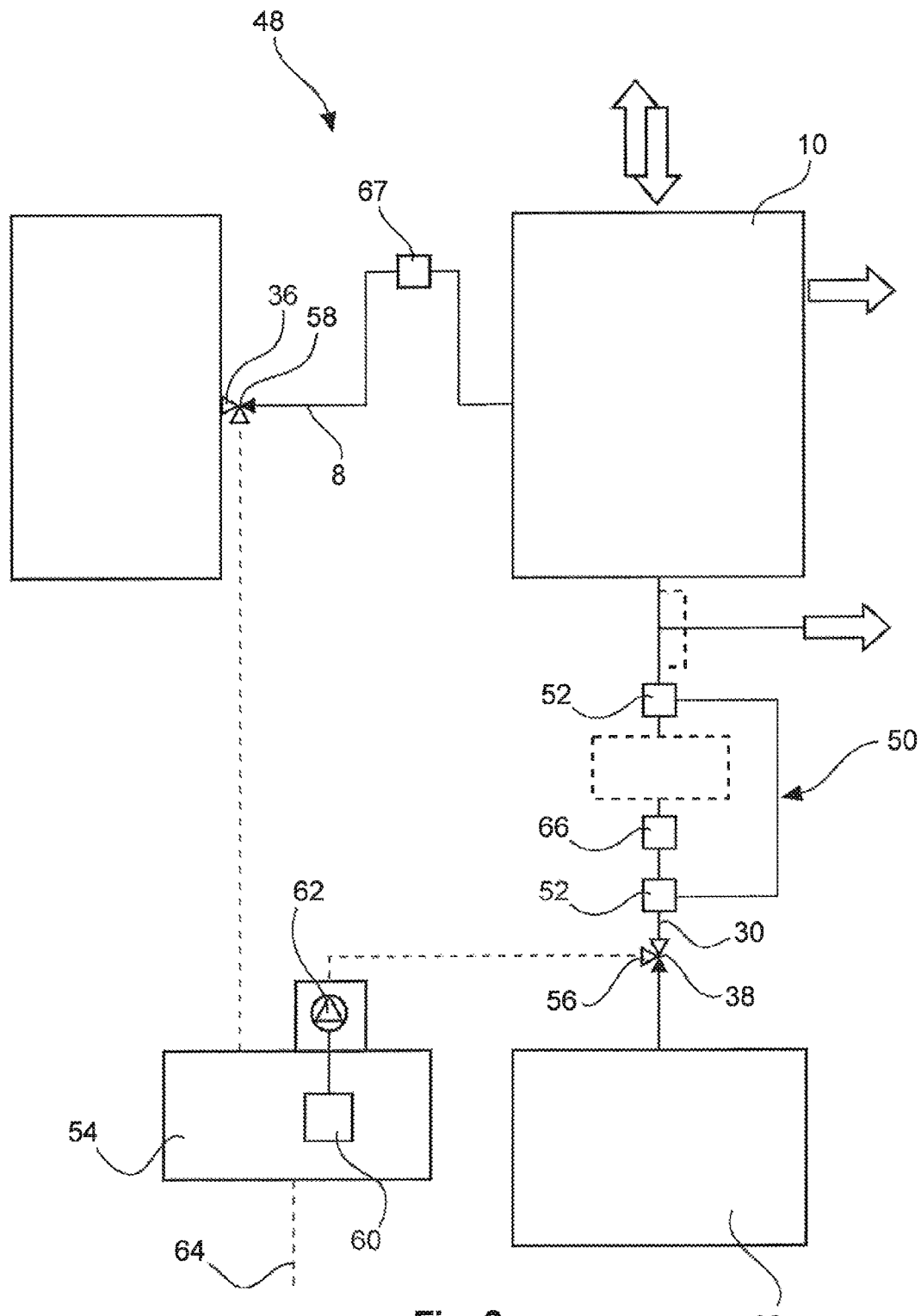
FIG. 2 shows another exemplary embodiment of a water system according to the present disclosure.

FIG. 2, in which a water system 48 according to the present disclosure is presented, is substantially identical. Instead of a steam generator 40, FIG. 2 shows a disinfection unit 54 that delivers a disinfectant to two germ reduction connections 56 and 58. Accordingly, the disinfection unit 54 may comprise a tank 60 for a disinfectant, and also a pump unit 62 that is equipped to convey the disinfectant into the germ reduction connections 56 and 58.

Disinfectant flows through all the water-conducting devices in the form of the exhaust gas line 8 and the water pipe 30 and the components within the water extraction unit 10. Disinfection takes place in a circulating system, wherein the circulation is implemented by conveying the disinfectant by means of a pump 62 so that the disinfectant flows through all the components to be treated and subsequently returns to the disinfection unit 54. Subsequent drainage of the disinfectant as well as rinsing of the water system 48 may take place by way of the germ reduction connection 56 or 58. This requires that all the water-conducting devices are designed in such a manner that the germ-reducing fluid can flow in a gravity-fed manner to a discharge pipe 64 underneath the disinfection unit 54.

In the water system 48 of FIG. 2 it may be advantageous to be able to close off all the lines connected to the water system 48 by means of a closing valve 36 and 38, and furthermore to install at least one automatic vent valve 66 and to provide open system boundaries with liquid-tight air release valves 67 at the highest position or positions of the disinfectant-conducting system.

Figure 3:
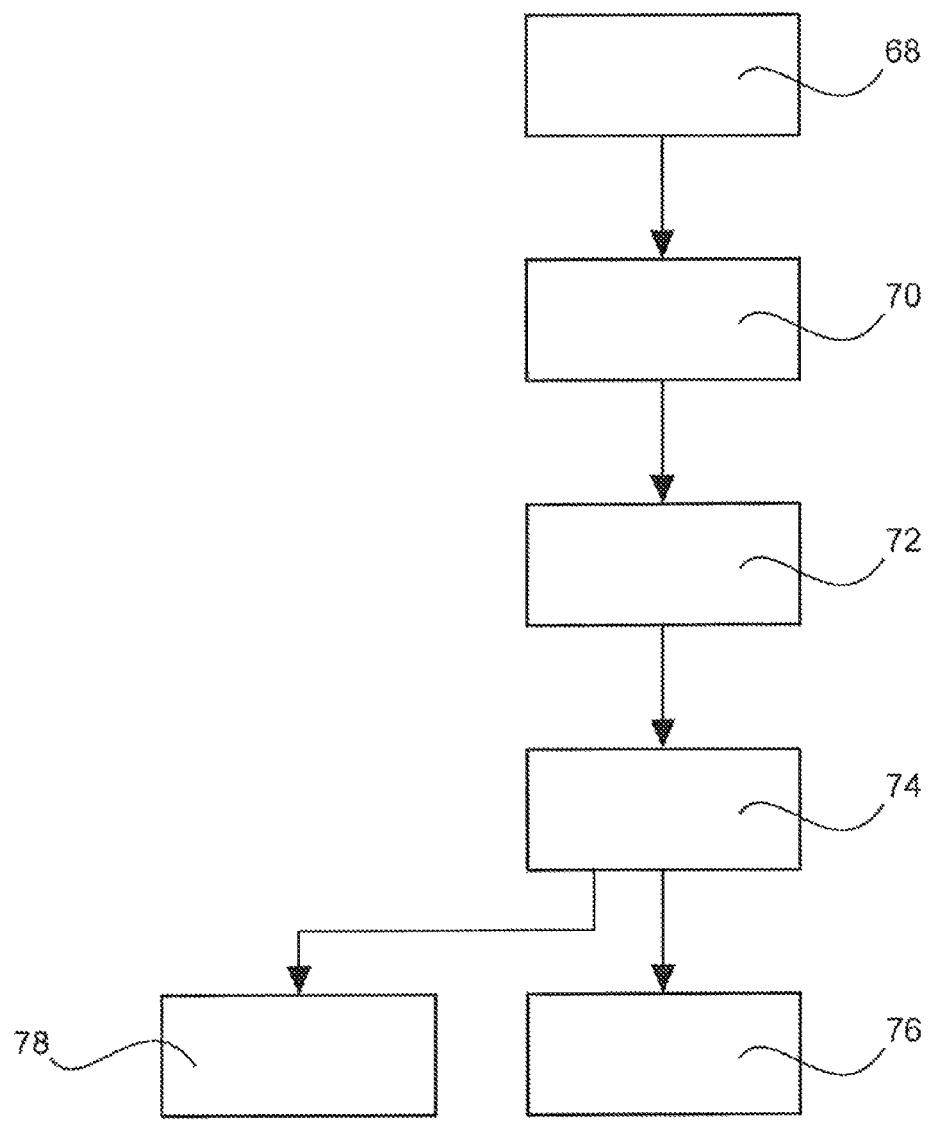
FIG. 3 shows a diagrammatic block view of a method according to the various teachings of the present disclosure.

FIG. 3 shows a diagrammatic view of a method according to the present disclosure for germ reduction in a water system of an aircraft. The method generally comprises closing 68 closing valves to at least one water supply source; introducing 70 a germ-reducing fluid to at least one water-conducting device; interrupting 72 the introduction of the germ-reducing fluid; opening 74 the closing valves; and rinsing 76 the water-conducting device with water; or draining 78.

Figure 4:
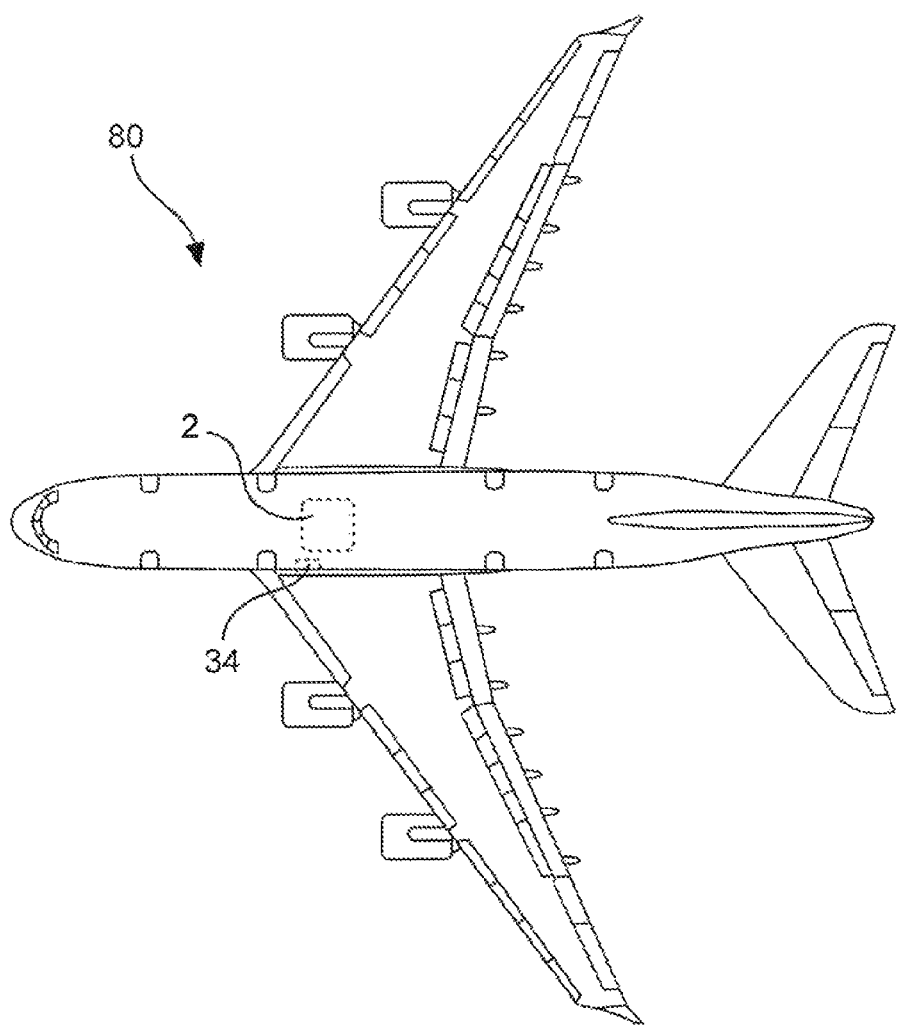
FIG. 4 shows an aircraft comprising at least one water system according to the various teachings of the present disclosure.

Lastly, FIG. 4 shows an aircraft 80 equipped with at least one water system 2 or 48.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A water system for a vehicle having a water flow path, comprising:

at least one fuel cell having an outlet;
at least one water-conducting device connected to the at least one fuel cell at the outlet;
a first closing valve positioned at the outlet of the at least one fuel cell such that the outlet and the first closing valve are between the at least one fuel cell and the at least one water conducting device along the water flow path;
a water supply tank coupled to the at least one water-conducting device downstream from the at least one fuel cell;
at least one vent valve for venting the at least one water-conducting device during a germ reduction;
a second closing valve positioned at the water supply tank between the water supply tank and the at least one water conducting device along the water flow path; and
at least one germ reduction connection connected to the water conducting device between the first closing valve and the second closing valve to introduce a germ-reducing fluid into the at least one water-conducting device for germ reduction of the water-conducting device, wherein the first closing valve and second closing valve are fully closeable to prevent any ingress of germ-reducing fluid into the at least one fuel cell and the water supply tank such that only the at least one water conducting device receives the germ-reducing fluid.

2. The water system of claim 1, wherein the first closing valve is arranged directly on an exhaust gas connection of the fuel cell.

3. The water system of claim 1, further comprising at least one process sensor for determining fluid parameters and times for germ reduction, and the process sensor is coupled to a water-conducting component of the at least one water-conducting device.

4. The water system of claim 3, wherein the process sensor is a temperature sensor.

5. The water system of claim 3, wherein the process sensor is a material sensor.

6. The water system of claim 1, further comprising a control unit that is connected to the first closing valve and second closing valve and that is designed to close the first closing valve and second closing valve prior to a germ reduction process being carried out.

7. The water system of claim 1, further comprising a water treatment device connected to the at least one water-conducting device, and a bypass, arranged parallel to the water treatment device, which bypass is connected to the at least one water-conducting device by way of bypass valves and that channels the germ-reducing fluid around the water treatment device during a germ-reduction process.

8. The water system of claim 1, further comprising a source for a germ-reducing fluid.

9. The water system of claim 8, wherein the source is a steam generator.

10. The water system of claim 8, wherein the source is a device for delivering a liquid disinfectant.

11. A method for germ reduction of a water system in a vehicle having a water flow path, comprising:

closing a first closing valve positioned at an outlet of at least one fuel cell such that the outlet and the first closing valve are between the at least one fuel cell and at least one water conducting device along the water flow path, the at least one water-conducting device connected to the at least one fuel cell at the outlet;
closing a second closing valve positioned at a water supply tank between the water supply tank and the at least one water conducting device along the water flow path, the water supply tank coupled to the at least one water-conducting device downstream from the at least one fuel cell;

introducing a germ-reducing fluid into at least one germ reduction connection connected to the at least one water-conducting device between the first closing valve and the second closing valve for germ reduction of the at least one water-conducting device, the first closing valve and second closing valve fully closeable to prevent any ingress of germ-reducing fluid into the at least one fuel cell and the water supply tank such that only the at least one water conducting device receives the germ-reducing fluid, the system including at least one vent valve for venting the at least one water-conducting device during the germ reduction;

interrupting the introduction of the germ-reducing fluid; and opening the first closing valve and the second closing valve.

12. An aircraft, comprising:
a water system comprising:
a water flow path;
a fuel cell having an exhaust gas connection;
at least one water-conducting device connected to the fuel cell at the exhaust gas connection;
a first closing valve arranged directly on the exhaust gas connection of the fuel cell such that the first closing valve is between the fuel cell and the at least one water conducting device along the water flow path;
a water supply tank coupled to the at least one water-conducting device downstream from the fuel cell;
at least one vent valve for venting the at least one water-conducting device during the germ reduction;
a second closing valve positioned at the water supply tank between the water supply tank and the at least one water conducting device along the water flow path; and
at least one germ reduction connection connected to the at least one water conducting device between the first closing valve and the second closing valve to introduce a germ-reducing fluid into the at least one water-conducting device for germ reduction of the water-conducting device,
wherein the first closing valve and second closing valve are fully closeable to prevent any ingress of germ-reducing fluid into the fuel cell and the water supply tank such that only the at least one water conducting device receives the germ-reducing fluid.

13. The aircraft of claim 12, further comprising a control unit that is connected to the first closing valve and second closing valve and that is designed to close the first closing valve and second closing valve prior to a germ reduction process being carried out.

14. The aircraft of claim 12, further comprising a water treatment device connected to the at least one water-conducting device, and a bypass, arranged parallel to the water treatment device, which bypass is connected to the at least one water-conducting device by way of bypass valves and that channels the germ-reducing fluid around the water treatment device during a germ-reduction process.

15. The aircraft of claim 12, further comprising at least one process sensor for determining fluid parameters and times for germ reduction, and the process sensor is coupled to a water-conducting component of the at least one water-conducting device.

* * * * *